United States Patent
Ishii et al.

(10) Patent No.: US 9,071,754 B2
(45) Date of Patent: Jun. 30, 2015

(54) IMAGE CAPTURING APPARATUS, IMAGE PROCESSING APPARATUS, IMAGE PROCESSING METHOD, AND IMAGE PROCESSING PROGRAM

(75) Inventors: Yasunori Ishii, Osaka (JP); Yusuke Monobe, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 247 days.

(21) Appl. No.: 13/697,624

(22) PCT Filed: May 11, 2011

(86) PCT No.: PCT/JP2011/002636
§ 371 (c)(1),
(2), (4) Date: Nov. 13, 2012

(87) PCT Pub. No.: WO2011/145296
PCT Pub. Date: Nov. 24, 2011

(65) Prior Publication Data
US 2013/0063616 A1 Mar. 14, 2013

(30) Foreign Application Priority Data

May 21, 2010 (JP) .................................. 2010-117676
May 25, 2010 (JP) .................................. 2010-119384

(51) Int. Cl.
*H04N 5/228* (2006.01)
*H04N 5/232* (2006.01)
*G06K 9/40* (2006.01)

(52) U.S. Cl.
CPC ....... *H04N 5/23248* (2013.01); *H04N 5/23254* (2013.01); *H04N 5/23267* (2013.01)

(58) Field of Classification Search
CPC .. H04N 5/23248–5/23267; G06T 2207/20201; G06T 5/003; G06T 5/004
USPC ............................ 348/208.1–208.12; 382/254
See application file for complete search history.

(56) References Cited

U.S. PATENT DOCUMENTS

| 6,429,895 | B1 * | 8/2002 | Onuki .................. 348/208.99 |
| 2005/0057661 | A1 | 3/2005 | Tanaka | |

(Continued)

FOREIGN PATENT DOCUMENTS

| JP | 2005-064851 A | 3/2005 |
| JP | 2008-061217 A | 3/2008 |

(Continued)

OTHER PUBLICATIONS

Extended European Search report for corresponding EP Application No. 11783235.3 dated Mar. 20, 2014.

(Continued)

*Primary Examiner* — Christopher K Peterson
(74) *Attorney, Agent, or Firm* — Renner, Otto, Boisselle & Sklar, LLP

(57) ABSTRACT

This image capture device is configured to generate a restored image by reducing a motion blur that has been induced by a camera shake during shooting. The device includes: an image sensor 10; an optical system 20; and an image processing section 220 which processes an image signal that has been obtained by the image sensor 10. The image processing section 220 includes: a blur kernel determining section which determines a blur kernel that defines the camera-shake-induced motion blur of the image captured; and an image restoration section which generates the restored image. The blur kernel determining section changes the size of the blur kernel by reference to information that affects the degree of the blur of the image such as the zoom power of the optical system 20.

16 Claims, 17 Drawing Sheets

(56) References Cited

U.S. PATENT DOCUMENTS

| | | |
|---|---|---|
| 2006/0279639 A1* | 12/2006 | Silverstein et al. ...... 348/208.14 |
| 2007/0154197 A1 | 7/2007 | Saijo et al. |
| 2008/0002900 A1 | 1/2008 | Miki et al. .................... 382/254 |
| 2008/0027994 A1 | 1/2008 | Guan |
| 2008/0166115 A1 | 7/2008 | Sachs et al. ..................... 396/55 |
| 2008/0266413 A1 | 10/2008 | Cohen et al. |
| 2009/0086174 A1 | 4/2009 | Fukumoto et al. |
| 2010/0053346 A1 | 3/2010 | Mitsunaga |
| 2010/0053350 A1* | 3/2010 | Miyauchi et al. .......... 348/222.1 |
| 2010/0208944 A1* | 8/2010 | Fukunishi .................... 382/107 |

FOREIGN PATENT DOCUMENTS

| | | |
|---|---|---|
| JP | 2008-099025 A | 4/2008 |
| JP | 2009-111596 A | 5/2009 |
| WO | WO 2006/030488 A1 | 3/2006 |

OTHER PUBLICATIONS

International Search Report for corresponding International Application No. PCT/JP2011/002636 mailed Jun. 7, 2011.

International Preliminary Report on Patentability for corresponding International Application No. PCT/JP2011/002636 dated Feb. 14, 2012.

Fergus et al., "Removing Camera Shake from a Single Photograph", SIGGRAPH 2006.

Shan et al., "High-quality Motion Deblurring from a Single Image", SIGGRAPH, 2008.

Co-pending U.S. Appl. No. 13/697,686, filed Nov. 13, 2012.

Supplementary European Search Report for corresponding European Application No. 11783236.0 dated Mar. 20, 2014.

Chinese Search Report for related Chinese Application No. 201180024954.0 dated Jan. 19, 2015 and English translation.

* cited by examiner

FIG.2 (a)            (b)

|     |     |     |
|-----|-----|-----|
| 0   | 0   | 0   |
| 0.2 | 0.4 | 0.4 |
| 0   | 0   | 0   |

|    |    |    |    |    |
|----|----|----|----|----|
| 15 | 17 | 20 | 16 | 14 |
| 18 | 19 | 21 | 18 | 17 |
| 21 | 20 | 25 | 21 | 19 |
| 24 | 22 | 24 | 22 | 20 |
| 27 | 25 | 22 | 21 | 20 |

FIG.3A

|    |    |    |    |    |
|----|----|----|----|----|
| 15 | 17 | 20 | 16 | 14 |
| 18 | 19 | 21 | 18 | 17 |
| 21 | 20 | 25 | 21 | 19 |
| 24 | 22 | 24 | 22 | 20 |
| 27 | 25 | 22 | 21 | 20 |

$*$

|     |     |     |
|-----|-----|-----|
| 0   | 0   | 0   |
| 0.2 | 0.4 | 0.4 |
| 0   | 0   | 0   |

$=$

|   |      |   |   |   |
|---|------|---|---|---|
|   |      |   |   |   |
|   | 19.6 |   |   |   |
|   |      |   |   |   |
|   |      |   |   |   |
|   |      |   |   |   |

FIG.3B

|    |    |    |    |    |
|----|----|----|----|----|
| 15 | 17 | 20 | 16 | 14 |
| 18 | 19 | 21 | 18 | 17 |
| 21 | 20 | 25 | 21 | 19 |
| 24 | 22 | 24 | 22 | 20 |
| 27 | 25 | 22 | 21 | 20 |

$*$

|     |     |     |
|-----|-----|-----|
| 0   | 0   | 0   |
| 0.2 | 0.4 | 0.4 |
| 0   | 0   | 0   |

$=$

|   |   |      |   |   |
|---|---|------|---|---|
|   |   |      |   |   |
|   |   | 19.4 |   |   |
|   |   |      |   |   |
|   |   |      |   |   |
|   |   |      |   |   |

FIG.5
(a)
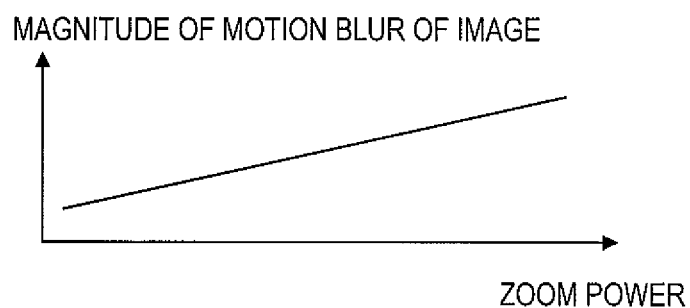
(b)
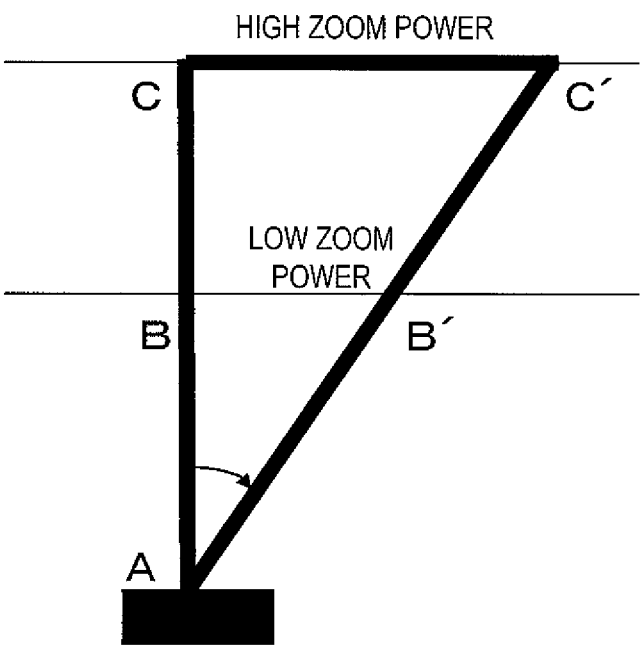

FIG.6
(a) MOTION BLUR OF IMAGE: SMALL
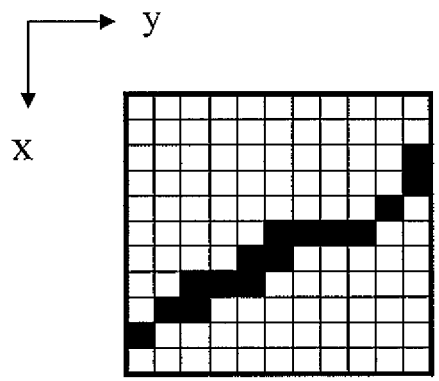
(b) MOTION BLUR OF IMAGE: LARGE
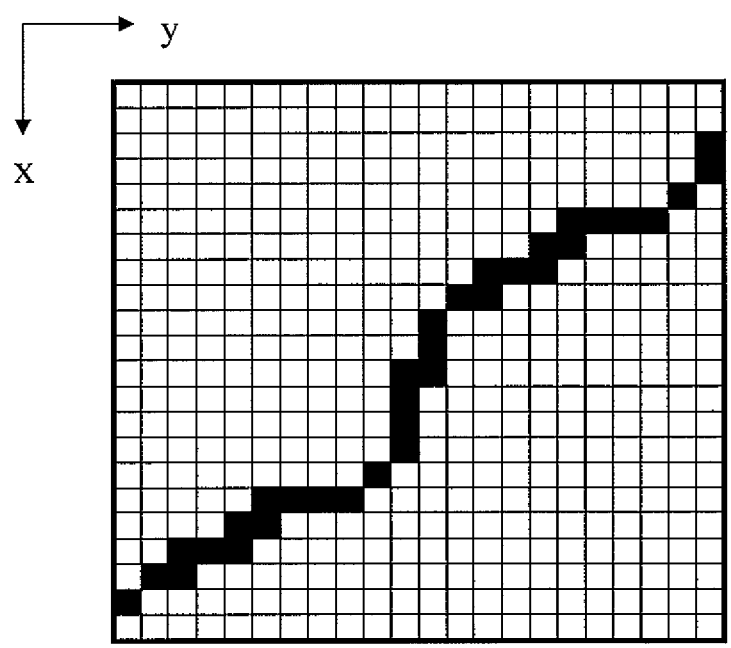

| ZOOM POWER | BLUR KERNEL'S MAGNIFICATION |
|---|---|
| z1-z2 | A1 |
| z2-z3 | A2 |
| . | . |
| . | . |
| . | . |

(b)

| ZOOM POWER | BLUR KERNEL'S SIZE |
|---|---|
| z1-z2 | N1 × N1 |
| z2-z3 | N2 × N2 |
| . | . |
| . | . |
| . | . |

| EXPOSURE TIME | BLUR KERNEL'S MAGNIFICATION |
|---|---|
| T1-T2 | B1 |
| T2-T3 | B2 |
| . | . |
| . | . |
| . | . |
| T10-T11 | B10 |

(b)

| EXPOSURE TIME | BLUR KERNEL'S SIZE |
|---|---|
| T1-T2 | N1 × N1 |
| T2-T3 | N2 × N2 |
| . | . |
| . | . |
| . | . |

| ZOOM POWER | EXPOSURE TIME | BLUR KERNEL'S MAGNIFICATION |
|---|---|---|
| z1-z2 | T1-T2 | C11 |
| . | T2-T3 | C12 |
| . | . | . |
| . | . | . |
| z2-z3 | T1-T2 | C21 |
| . | T2-T3 | C22 |
| . | . | . |
| . | . | . |

(b)

| ZOOM POWER | EXPOSURE TIME | BLUR KERNEL'S SIZE |
|---|---|---|
| z1-z2 | T1-T2 | N11 × N11 |
| . | T2-T3 | N12 × N12 |
| . | . | . |
| . | . | . |
| z2-z3 | T1-T2 | N21 × N21 |
| . | T2-T3 | N22 × N22 |
| . | . | . |
| . | . | . |

*FIG.16*

| ZOOM POWER | MAGNITUDE OF CAMERA SHAKE | BLUR KERNEL'S MAGNIFICATION |
|---|---|---|
| z1-z2 | M1-M2 | A11 |
| . | M2-M3 | A12 |
| . | . | . |
| . | . | . |
| . | . | . |
| z2-z3 | M1-M2 | A21 |
| . | M2-M3 | A22 |
| . | . | . |
| . | . | . |
| . | . | . |

IMAGE CAPTURING APPARATUS, IMAGE PROCESSING APPARATUS, IMAGE PROCESSING METHOD, AND IMAGE PROCESSING PROGRAM

TECHNICAL FIELD

The present invention relates to an image capture device, image processor, image processing method and image processing program for generating a restored image by reducing the motion blur that has been induced by a camera shake while capturing an image.

BACKGROUND ART

When an image is gotten (i.e., captured) with a digital camera, noise may be added to the image depending on a characteristic of its own CCD (charge-coupled device) or CMOS read circuit or a property of the transmission line. In addition, the image may also get blurred due to either out-of-focus shooting or a camera shake. In this manner, the quality of an image shot may deteriorate due to not only the noise resulting from the image's own characteristic but also the blur that has been caused by hand during the shooting operation. Among these multiple different kinds of "blurs", the blur of an image that has been induced by the movement of a camera during shooting (or exposure) will be sometimes referred to herein as a "motion blur".

Recently, as there is a growing demand for high-sensitivity shooting, it has become more and more necessary to restore such a blurry deteriorated image (which will be simply referred to herein as a "deteriorated image") to the original condition (which will be referred to herein as an "ideal image") as perfectly as possible. To capture a bright and noise- or blur-free image that should be obtained by high-sensitivity shooting, there are roughly two approaches: one of them is to increase the sensitivity and the other is to extend the exposure time.

If the sensitivity is increased, however, the noise will be amplified, too. As a result, the signal will be drowned in the noise, and the resultant image will be mostly covered with the noise in many cases. On the other hand, if the exposure time is extended, the light produced on the spot can be accumulated a lot and the resultant image will have much less noise. In that case, the signal will not be drowned in the noise but the image will get shaky much more easily due to a camera shake, which is a problem.

Thus, in order to extend the exposure time, two different approaches have been taken so far. One of them is optical image stabilization such as a lens shift or a sensor shift. According to the other method, the direction and/or the magnitude of the motion blur is/are obtained based on the captured image or by the sensor and then subjected to signal processing, thereby restoring the image (which will be referred to herein as a "restoration method by signal processing").

The optical image stabilization has only a limited correction range. If the exposure time is extended, a camera shake will be produced more easily, and therefore, the lens or the sensor needs to be shifted in a broader range. However, the longer the distance the lens or sensor needs to go, the longer the time delay caused by their shift. In addition, a physical limit prevents the designer from increasing the size of the camera unlimitedly.

Meanwhile, the restoration methods by signal processing are disclosed in Patent Document No. 1 and Non-Patent Documents Nos. 1 and 2, for example. Hereinafter, those restoration methods by signal processing will be described.

Suppose the intensity distribution of an image produced on the imaging area of an image sensor is represented by I(x, y). The coordinates (x, y) are two-dimensional coordinates indicating the location of a pixel (i.e., a photosensitive cell) on the imaging area. For example, if the image is made up of M×N pixels that are arranged in columns and rows and if x and y are integers that satisfy the inequalities $0 \leq x \leq M-1$ and $0 \leq y \leq N-1$, respectively, then the location of each of the pixels that form the image can be indicated by a set of coordinates (x, y). In this example, the origin (0, 0) of the coordinate system is supposed to be put at the upper left corner of the image, the x-axis is supposed to run vertically and the y-axis is supposed to run horizontally. However, the coordinate system may also be defined in any other way.

If the intensity distribution of a blur-free image (which is an ideal image or what the image should be) is represented by L(x, y), a point spread function (PSF) that defines the blur is represented by PSF(x, y) and the noise is represented by n(x, y), then the following Equation (1) is satisfied:

$$I(x,y) = PSF(x,y) * L(x,y) + n(x,y) \quad (1)$$

where the sign * indicates a two-dimensional convolution operation.

The point spread function PSF(x, y) of a camera shake depends on the trace of the camera that has been shaken (which will be referred to herein as a "camera shake trace") during shooting (or exposure). Since the camera shake trace changes every time an image is shot with the camera, PSF(x, y) also changes every shooting session with the camera.

If the camera shake trace during shooting has been detected by a gyrosensor, for example, and if PSF(x, y) is known, the deteriorated image I(x, y) can be restored to an image L(x, y) by performing a deconvolution operation using that PSF(x, y). On the other hand, unless PSF(x, y) is known, the deteriorated image I(x, y) needs to be restored to the image L(x, y) by estimating PSF(x, y) based on the deteriorated image I(x, y). The former method is called a "non-blind deconvolution", while the latter method is called a "blind deconvolution". Since PSF(x, y) and the image L(x, y) both need to be estimated based on the deteriorated image I(x, y) according to the blind deconvolution method, it is more difficult to reduce the blur than when the non-blind deconvolution method is adopted.

A PSF convolution operation that defines a camera-shake-induced motion blur is performed with a linear filter. A two-dimensional convolution operation linear filter is usually represented by a kernel consisting of a coefficient matrix with a size of N×N pixels, where N is an integer that is equal to or greater than three. The PSF that defines a blur can be represented by a blur kernel. Thus, to restore a blurry image to a less blurred (or non-blurred) image, the blur kernel that defines the blur needs to be estimated.

As a method for restoring an image by signal processing, Non-Patent Document No. 1 discloses that a multi-scale inference scheme is used to estimate a blur kernel and a restored image based on a single blurry image. According to that multi-scale inference scheme, first of all, a blur kernel having a size of 3×3 pixels is estimated by using a deteriorated image with a low resolution. After that, by gradually increasing the resolution of the deteriorated image for use in estimation, the resolution of the blur kernel is also raised. FIGS. 18(a) through 18(h) illustrate the method disclosed in Non-Patent Document No. 1. The upper part of FIG. 18(a) shows a blur kernel of 3×3 pixels, while the lower part shows a restored image with a corresponding resolution. The same statement applies to FIGS. 18(b) through 18(h), in which the resolution increases gradually in this order.

As there are a small number of pixels in the deteriorated image with a low resolution, the size of pixels with a camera-shake-induced motion blur is also small. As a result, in the deteriorated image with a low resolution, the size of the blur kernel becomes small and the complexity of computations to do to estimate the blur kernel is also little. Moreover, if the blur kernel were estimated using a deteriorated image with a high resolution and a large number of pixels from the beginning, then the estimation could converge to a local minimal representing a different blur kernel from the true one. According to the multi-scale inference scheme, however, the blur kernel can be estimated more accurately.

CITATION LIST

Patent Literature

Patent Document No. 1: Japanese Laid-Open Patent Publication No. 2009-111596

Non-Patent Literature

Non-Patent Document No. 1: Rob Fergus et al., "Removing Camera Shake from a Single Image", Barun Singh Aaron Hertzmann, SIGGRAPH 2006

Non-Patent Document No. 2: "High-quality Motion Deblurring from a Single Image", Qi Shan, Jiaya Jia, and Aseem Agarwala, SIGGRAPH 2008

SUMMARY OF INVENTION

Technical Problem

According to the methods disclosed in Non-Patent Documents Nos. 1 and 2, the final size of the blur kernel is set to be a fixed value in advance. That is why to perform restoration processing properly on a deteriorated image with a significant motion blur, the size of the blur kernel needs to be set to be a large value. A deteriorated image with a significant motion blur, which is even greater than the preset blur kernel's size, cannot be restored properly.

Particularly when the zoom power (or the focal length) of an optical system is increased to shoot a subject from a distance, the image will get shaky more significantly than in a situation where the zoom power is small. That is why if the zoom power is increased to shoot a distant scene, the size of the blur kernel should be set to be a large value in advance. In this description, the "zoom power" refers herein to the ratio of the focal length during shooting to the minimum focal length (i.e., at the wide angle end) of the optical system of the image capture device. That is why if the focal length during shooting is the minimum focal length, the zoom power is supposed to be 1×. It should be noted that in this description, the "zoom power" does not mean the ratio of the focal length at the telephoto end to the focal length at the wide angle end, although the term generally has such a meaning.

Also, in shooting an image in a dark environment, the exposure time needs to be extended in order to secure a sufficient quantity of light. Generally speaking, however, the longer the exposure time, the more significantly the image will get shaky due to a camera shake. For that reason, even if the exposure time is extended to shoot a dark scene, the size of the blur kernel should also be set to be a large value in advance.

If the size of the blur kernel is increased, however, restoration processing using a blur kernel of such a large size will be performed even on a slightly shaky image, and therefore, excessive computation should be carried out to get the restoration processing done in such a case. For example, if the size of the blur kernel is set to be 100×100 pixels and if an image, of which the motion blur can be defined with only 10×10 of those pixels, is going to be restored, unnecessary computation will have to be carried out on 9900 pixels (=100×100−10×10).

Patent Document No. 1 discloses that if the motion blur of a given image exceeds the preset size of the blur kernel, the number of pixels of that image is cut down and then the blur kernel is calculated and restoration processing is carried out. Then, even a significantly shaky image can also be restored properly using a blur kernel of the specified size. According to such a method, if the given image is only slightly shaky, the number of pixels is not decreased. And the number of pixels is cut down only when the given image is significantly shaky. As a result, the size of the blur kernel can be small enough.

According to the technique disclosed in Patent Document No. 1, however, if the given image is significantly shaky, the restoration processing is carried out after the number of pixels of that image has been cut down. That is why the restored image will also have the same small number of pixels. Since the restored image is expanded to the same size on the screen as the original one, the quality of the resultant image will be debased compared to the original image.

The present inventors made our invention in order to overcome those problems with the related art. And an object of the present invention is to provide an image restoration technique which can avoid doing such unnecessary computations to get the restoration processing done if the deteriorated image is only slightly shaky and which can prevent the restored image from having debased image quality even if the deteriorated image is significantly shaky.

Solution to Problem

An image capture device according to the present invention is configured to generate a restored image by reducing a motion blur that has been induced by a camera shake during shooting. The device includes: an image sensor; an optical system which produces an image on an imaging area of the image sensor; and an image processing section which processes a signal that has been obtained by the image sensor. The image processing section includes: a blur kernel determining section which determines a blur kernel that defines the camera-shake-induced motion blur of the image that has been captured by the image sensor; and an image restoration section which generates the restored image by reducing the camera-shake-induced motion blur from the image using the blur kernel that has been determined. The blur kernel determining section sets the size of the blur kernel by reference to information that affects the degree of the blur of the image.

In one embodiment, the blur kernel determining section changes the size of the blur kernel according to the zoom power of the optical system.

In one embodiment, the image capture device further includes a conversion table which defines a correspondence between the zoom power of the optical system and the size of the blur kernel, and the blur kernel determining section sets the size of the blur kernel by reference to the conversion table.

In one embodiment, the conversion table defines a correspondence between the zoom power of the optical system and the magnification of the blur kernel with respect to its reference size.

In one embodiment, the blur kernel determining section sets the size of the blur kernel by reference to both pieces of information about the zoom power of the optical system and an exposure time.

In one embodiment, the image capture device further includes a conversion table which defines a correspondence between the size of the blur kernel and a combination of the zoom power of the optical system and the exposure time, and the blur kernel determining section sets the size of the blur kernel by reference to the conversion table.

In one embodiment, the blur kernel determining section changes the size of the blur kernel according to an exposure time.

In one embodiment, the image capture device further includes a conversion table which defines a correspondence between the exposure time and the size of the blur kernel, and the blur kernel determining section sets the size of the blur kernel by reference to the conversion table.

In one embodiment, the conversion table defines a correspondence between the exposure time and the magnification of the blur kernel with respect to its reference size.

In one embodiment, the image capture device further includes a camera shake sensing section which senses the magnitude of the camera shake during shooting, and the blur kernel determining section sets the size of the blur kernel based on the magnitude of the camera shake that has been sensed by the camera shake sensing section.

In one embodiment, the camera shake sensing section is a gyrosensor.

An image processor according to the present invention is configured to generate a restored image by reducing a motion blur that has been induced by a camera shake from an image that has been captured by an image capture device. The processor includes: an image getting section which gets the image and information that affects the degree of the motion blur of the image; a blur kernel determining section which determines a blur kernel that defines the camera-shake-induced motion blur of the image; and an image restoration section which generates the restored image by reducing the camera-shake-induced motion blur from the image using the blur kernel that has been determined. The blur kernel determining section sets the size of the blur kernel by reference to the information that affects the degree of the blur of the image.

In one embodiment, the shooting information is at least one piece of information about the zoom power of an optical system, an exposure time, and the magnitude of the camera shake during shooting.

An image processing program according to the present invention is designed to generate a restored image by reducing a motion blur that has been induced by a camera shake from an image that has been captured by an image capture device. The program is defined to make a computer perform the steps of: getting the image and information that affects the degree of the motion blur of the image; setting the size of a blur kernel that defines the camera-shake-induced motion blur of the image by reference to the information that affects the degree of the motion blur of the image; determining the blur kernel; and generating the restored image by reducing the camera-shake-induced motion blur from the image using the blur kernel that has been determined.

In one embodiment, the information that affects the degree of the motion blur of the image is at least one piece of information about the zoom power of an optical system, an exposure time, and the magnitude of the camera shake during shooting.

An image processing method according to the present invention is a method for generating a restored image by reducing a motion blur that has been induced by a camera shake from an image that has been captured by an image capture device. The method includes the steps of: getting the image and information that affects the degree of the motion blur of the image; setting the size of a blur kernel that defines the camera-shake-induced motion blur of the image by reference to the information that affects the degree of the motion blur of the image; determining the blur kernel; and generating the restored image by reducing the camera-shake-induced motion blur from the image using the blur kernel that has been determined.

In one embodiment, the information that affects the degree of the motion blur of the image is at least one piece of information about the zoom power of an optical system, an exposure time, and the magnitude of the camera shake during shooting.

Advantageous Effects of Invention

According to the present invention, it is possible to avoid doing unnecessary computations to get the restoration processing done if the deteriorated image is only slightly shaky and it is also possible to prevent the restored image from having debased image quality even if the deteriorated image is significantly shaky.

BRIEF DESCRIPTION OF DRAWINGS

FIG. 2 ($a$) illustrates an example of a blur kernel with a size of 3×3 pixels and ($b$) shows an example of a pixel value arrangement of a non-blurry image.

FIG. 3A Shows the result of the convolution operation that has been performed on the pixel located at (x, y)=(2, 2) in the image shown in FIG. 2($b$).

FIG. 3B Shows the result of the convolution operation that has been performed on the pixel located at (x, y)=(2, 3) in the image shown in FIG. 2($b$).

FIG. 5 ($a$) is a graph showing, as an example, how the size of a blur kernel may change with the zoom power and ($b$) schematically illustrates how the magnitude of a motion blur of an image increases with the zoom power in a situation where a camera has rotated by a certain angle.

FIG. 6 ($a$) shows that when the camera shake is expected to be insignificant, the size of the blur kernel is set to be a small value and ($b$) shows that when the camera shake is expected to be significant, the size of the blur kernel is set to be a large value.

FIG. 11 (a) shows an example of a conversion table for use in the first embodiment and (b) shows another example of a conversion table for use in the first embodiment.

FIG. 13 (a) shows an example of an exposure time related conversion table and (b) shows another example of such a conversion table.

FIG. 14 (a) shows an example of a zoom power-exposure time combination related conversion table and (b) shows another example of such a conversion table.

FIG. 16 Shows an example of a conversion table for use in the second embodiment.

DESCRIPTION OF EMBODIMENTS

Before preferred embodiments of the present invention are described, the fundamental principle of the present invention will be described first. In this description, the "size" of an image or a blur kernel is supposed to be synonymous with its "number of pixels" or "pixel size".

Figure 1A:
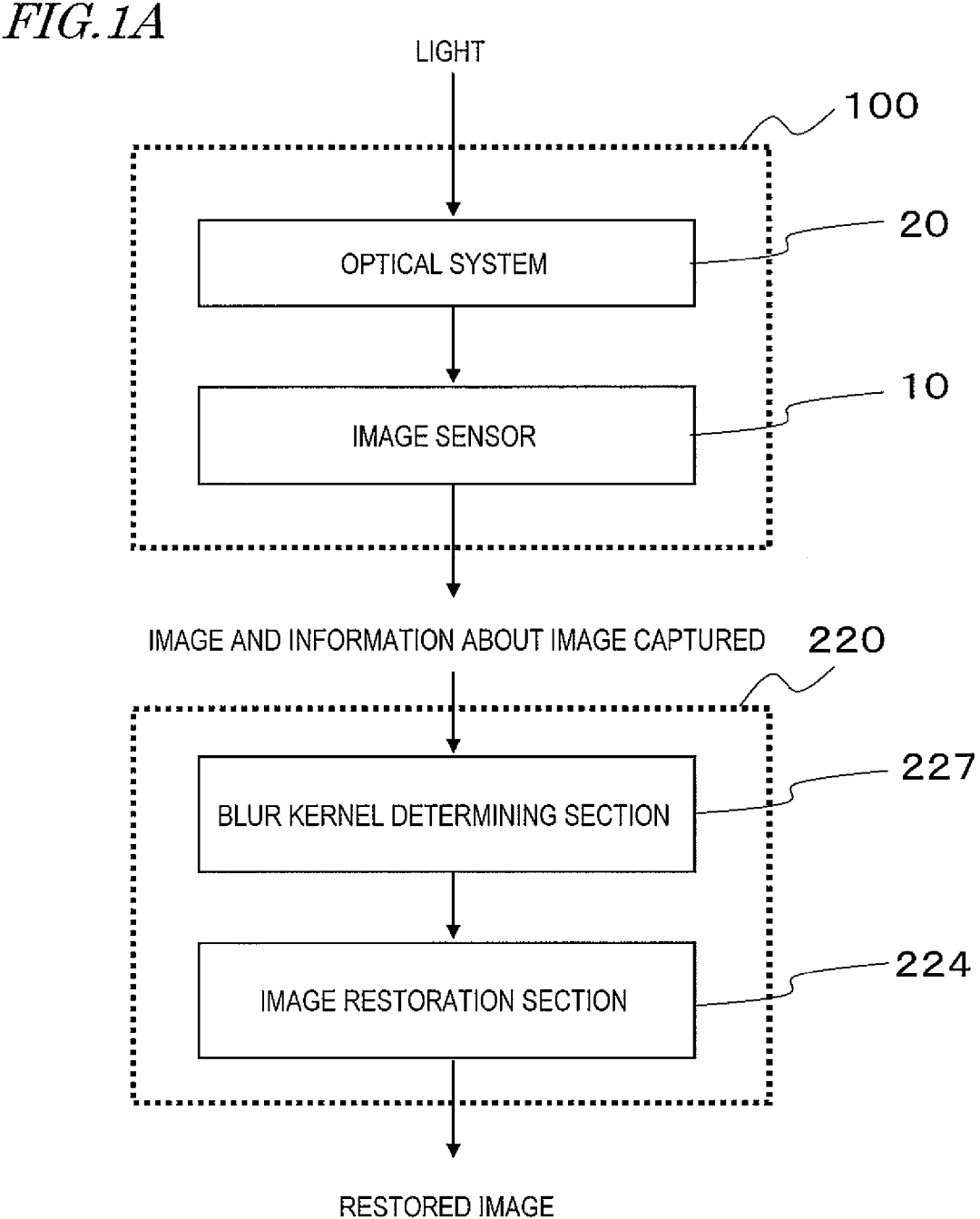
FIG. 1A Illustrates an exemplary general configuration for an image capture device according to the present invention.

FIG. 1A illustrates a general configuration for an image capture device according to the present invention. The image capture device includes an image capturing section 100 with an image sensor 10 and an optical system 20 and an image processing section 220 which processes the image signal that has been obtained by the image sensor 10. The image processing section 220 includes a blur kernel determining section 227 which determines a blur kernel that defines the camera-shake-induced motion blur of the image that has been captured by the image sensor 10 and an image restoration section 224 which generates a restored image. The blur kernel determining section 227 can change the size of the blur kernel by reference to pieces of information that could affect the degree of motion blur of an image such as a zoom power and an exposure time.

Figure 1B:
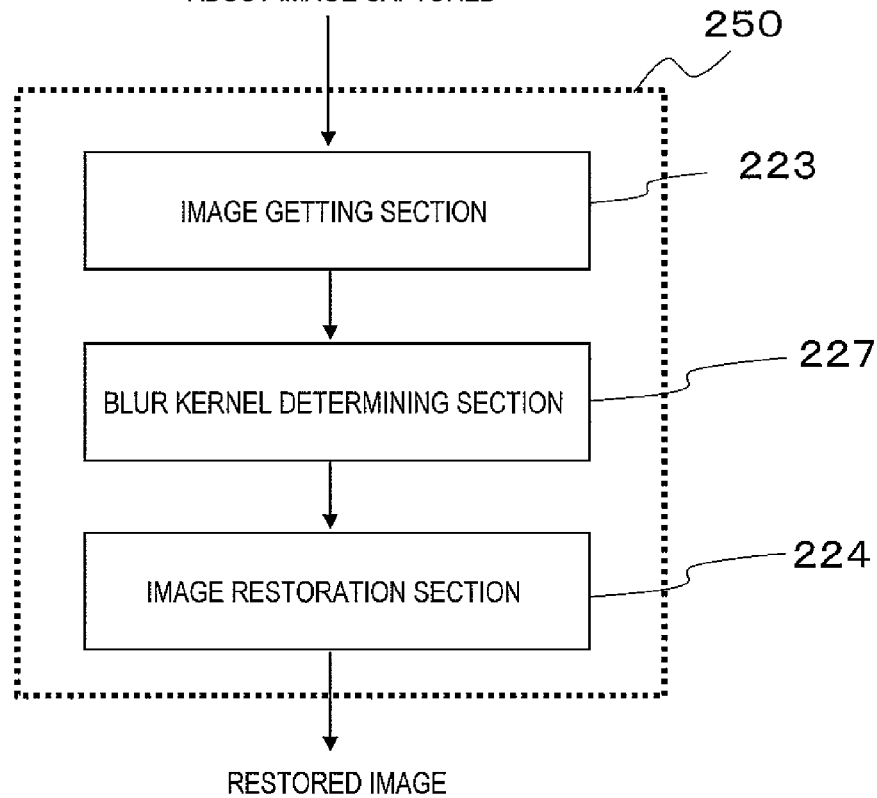
FIG. 1B Illustrates an exemplary general configuration for an image processor according to the present invention.

FIG. 1B illustrates an exemplary general configuration for an image processor according to the present invention. The image processor 250 includes an image getting section 223 which gets an image that has been captured by the image capture device and information about the image captured such as a zoom power and an exposure time during a shooting operation, a blur kernel determining section 227 which determines a blur kernel that defines the motion blur of an image, and an image restoration section 224 which generates a restored image. The blur kernel determining section 227 can change the size of the blur kernel by reference to the information about the image captured such as a zoom power and an exposure time.

Figure 1C:
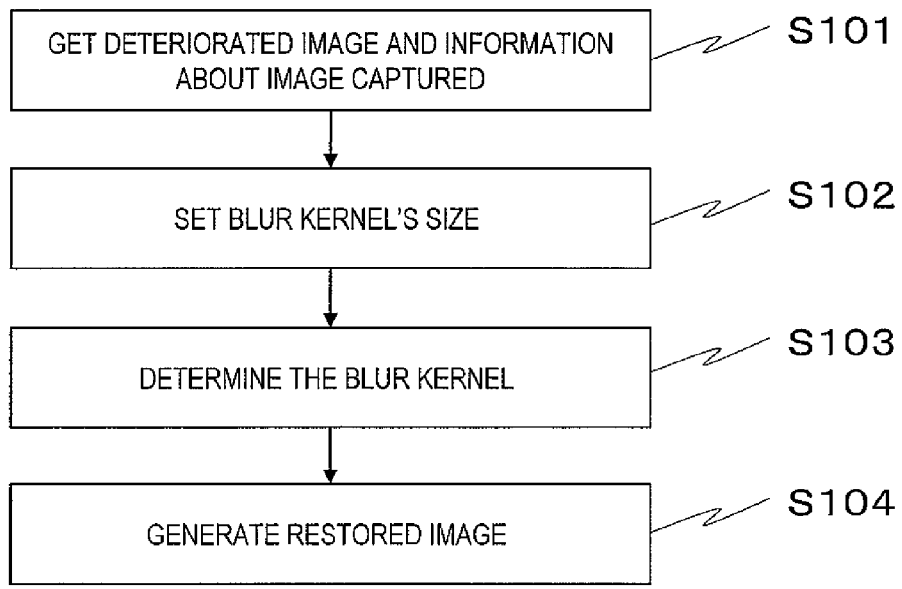
FIG. 1C A flowchart showing an exemplary flow of the image restoration processing to be carried out by either the image processing section or the image processor.

FIG. 1C is a flowchart showing an exemplary flow of the image restoration processing to be carried out by either the image processing section 220 or the image processor 250. First, in Step S101, a deteriorated image that has been captured by an image capture device and information about the image captured are gotten. Next, in Step S102, the size of a blur kernel that defines the degree of motion blur of the deteriorated image is set. Subsequently, in Step S103, the blur kernel is determined. And then in Step S104, a restored image is generated using the blur kernel that has been determined. By performing these processing steps, a restored image can be obtained with the motion blur removed from the deteriorated image. According to the present invention, by setting the size of the blur kernel appropriately by reference to information that could affect the degree of motion blur of an image, the restoration can get done highly accurately without doing unnecessary computations. These processing steps will be described in further detail later.

Next, it will be described with reference to FIG. 2 specifically what the blur kernel is according to the present invention.

FIG. 2(a) illustrates an example of a blur kernel with a size of 3×3 pixels. This blur kernel defines an example of a motion blur that has been induced by a horizontal camera shake of three pixels during an exposure process. FIG. 2(b) shows an example of a pixel value arrangement of a non-blurry image, which is supposed to have a size of 5×5 pixels. The twenty-five numerical values shown in FIG. 2(b) are exemplary intensity values of pixels that form the image.

If a motion blur, which is represented by the blur kernel shown in FIG. 2(a), has been induced by a camera shake, the deteriorated image can be obtained by performing a two-dimensional convolution operation on the image shown in FIG. 2(b) by using the blur kernel shown in FIG. 2(a).

Supposing the blur kernel, the original image and the noise are identified by K, L and N, respectively, the image I that has been obtained by shooting (i.e., the deteriorated image) is represented by the following Equation (2):

$$I = K*L + N \tag{2}$$

FIG. 3A shows the result of the convolution operation that has been performed on the pixel located at $(x, y)=(2, 2)$ in the image shown in FIG. 2(b). This operation is carried out on the nine pixels (=3×3 pixels) that are enclosed within the dashed rectangle that is located at the upper left corner of the image shown in FIG. 3A. Of the nine coefficients of the blur kernel, three elements have values of 0.2, 0.4 and 0.4, respectively, but the other six elements have a value of zero. If the convolution operation is performed using this blur kernel, these coefficients of 0.2, 0.4 and 0.4 are multiplied by the values of three pixels located at (2, 1), (2, 2) and (2, 3), respectively, in the image and then those products are added together to calculate a sum. As a result, a value of 19.6 (=18×0.2+19×0.4+21×0.4) is obtained and is stored at the location (2, 2) as a pixel value after the operation.

On the other hand, FIG. 3B shows the result of the convolution operation that has been performed on the pixel located at $(x, y)=(2, 3)$ in the image shown in FIG. 2(b). This operation is carried out on the nine pixels (=3×3 pixels) that are enclosed within the dashed rectangle that is located at the upper left corner of the image shown in FIG. 3B. If the convolution operation is performed using this blur kernel, the coefficients of 0.2, 0.4 and 0.4 are multiplied by the values of three pixels located at (2, 2), (2, 3) and (2, 4), respectively, in the image and then those products are added together to calculate a sum. As a result, a value of 19.4 (=19×0.2+21×0.4+18×0.4) is obtained and is stored at the location (2, 3) as a pixel value after the operation.

By making such calculations with the center position of the blur kernel shifted with respect to the pixel values of an image with a given resolution (i.e., a given number of pixels), an image that has gone through the convolution operation, that is, an image with a camera-shake-induced motion blur (i.e., a deteriorated image), can be obtained.

In order to restore the deteriorated image to a non-blurry image, the coefficient matrix of the blur kernel that would cause the deterioration needs to be estimated. And if the blur kernel can be estimated, an image that has not deteriorated yet can be recovered by performing a deconvolution operation.

Figure 4:
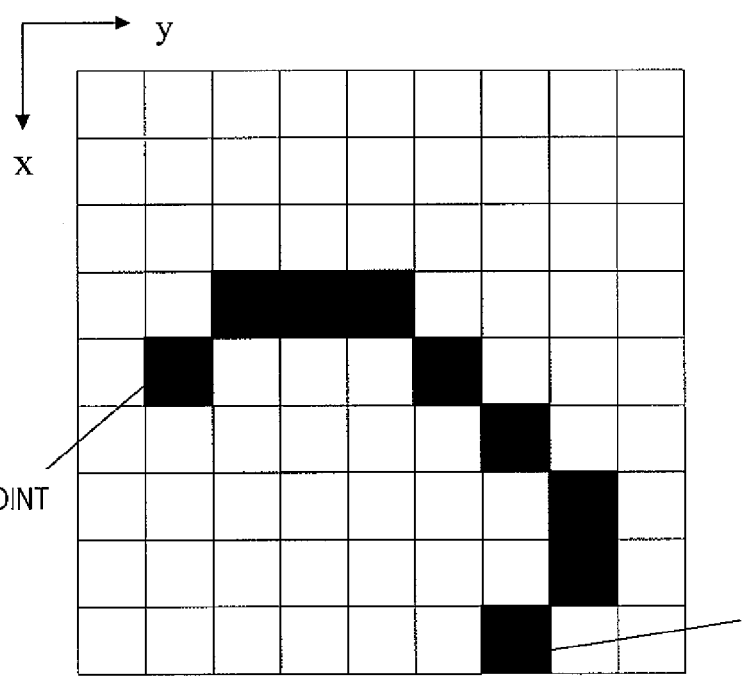
FIG. 4 ($a$) shows an example of a blur kernel's coefficient matrix consisting of 9×9 pixels and ($b$) indicates those elements with non-zero values by the solid squares, and the other elements with a value of zero by the open squares, respectively, among the coefficients shown in FIG. 4($a$).

FIG. 4(a) shows an example of a blur kernel's coefficient matrix consisting of 9×9 pixels. This coefficient matrix is standardized so that the sum of non-zero coefficients becomes equal to one. In FIG. 4(b), of the coefficients shown in FIG. 4(a), those elements with non-zero values are indicated by the solid squares, while the other elements with a value of zero are indicated by the open squares. The set of those solid elements shown in FIG. 4(a) corresponds to the trace of the camera shake. The set of solid elements shown in FIG. 4(b) may have a different pattern according to the camera shake trace left during the exposure process.

Since the camera shake is caused by the movement of a camera during an exposure process, its trace is represented by either a line or a curve that connects the starting point and the end point together. As shown in FIG. 4(b), in the camera shake trace represented by the blur kernel with a finite size, even a "curve" which forms only a part of that trace can also be obtained by connecting two pixels together with a line.

According to the present invention, the size of the blur kernel is not set in advance before shooting but is set adaptively according to the expected magnitude of a motion blur of the image. The size of the blur kernel may be determined according to a zoom power or an exposure time, for example.

FIG. 5(a) is a graph showing, as an example, how the magnitude of a motion blur of an image may change with the zoom power. As shown in FIG. 5(a), in general, the larger the zoom power, the greater the magnitude of a motion blur of an image. FIG. 5(b) schematically illustrates how the magnitude of a motion blur of an image due to a camera shake that has occurred changes with the zoom power. Suppose a triangle to be defined by the center of mass A of an image capture device that has rotated by a certain angle due to a camera shake during the exposure process and a line segment that connects together two corresponding points on the optical axis before and after the rotation. In this case, a triangle ΔABB' to be drawn when the zoom power is small and a triangle ΔACC' to be drawn when the zoom power is large are analogous to each other. As shown in FIG. 5(a), the larger the zoom power, the larger the triangle drawn and the greater the magnitude of the motion blur of the image. Simply thinking, if in two analogous triangles, one side thereof is multiplied by m (where m is a positive number), the other sides thereof will also be multiplied by m. That is why the magnitude of the motion blur of an image increases proportionally to the zoom power. Actually, however, the image capture device does not move at a constant angular velocity but moves in an irregular pattern during the exposure process. As a result, the longer the exposure time, the more significantly different from such a simple proportionality the relation between the zoom power and the magnitude of the motion blur.

The same thing also happens even when the exposure time during shooting is extended. Generally speaking, even if the zoom power is constant, the longer the exposure time, the more significantly camera shakes accumulated and the greater the magnitude of the motion blur of the image.

Hereinafter, exemplary sizes of the blur kernel that may be set according to the present invention will be described. FIG. 6(a) shows the size of a blur kernel in an image with a relatively small magnitude of motion blur, which corresponds to a situation where the zoom power is small or the exposure time is short. In that case, the size of the blur kernel is set to be relatively small. On the other hand, FIG. 6(b) shows the size of a blur kernel in an image with a relatively large magnitude of motion blur, which corresponds to a situation where the zoom power is large or the exposure time is long. In that case, the size of the blur kernel is set to be relatively large.

As can be seen, according to the present invention, the size of a blur kernel is set adaptively to the expected magnitude of motion blur by reference to pieces of information that could affect the magnitude of the motion blur of an image such as the zoom power or the exposure time. As a result, when restoration processing is carried out on an image with a slight motion blur, it is possible to avoid doing computations more than necessarily. In addition, unlike the technique disclosed in Patent Document No. 1, this restoration processing can get done even without decreasing the pixel size of the original image or increasing the pixel size of the restored image. Consequently, the resolution of the finally restored image does not decrease, and therefore, a restored image of high quality can be obtained. It should be noted that in this description, those pieces of information that could affect the magnitude of the motion blur of an image are not only the zoom power and the exposure time but may also be a piece of information indicating the magnitude of a camera shake that has been sensed by a camera shake sensing mechanism built in the image capture device as will be described later.

Hereinafter, a preferred embodiment of the present invention will be described with reference to FIGS. 7 through 17. In the following description, any pair of components shown in multiple drawings and having substantially the same function will be identified by the same reference numeral.

Embodiment 1

First of all, a first embodiment of the present invention will be described with reference to FIGS. 7 through 14.

Figure 7:
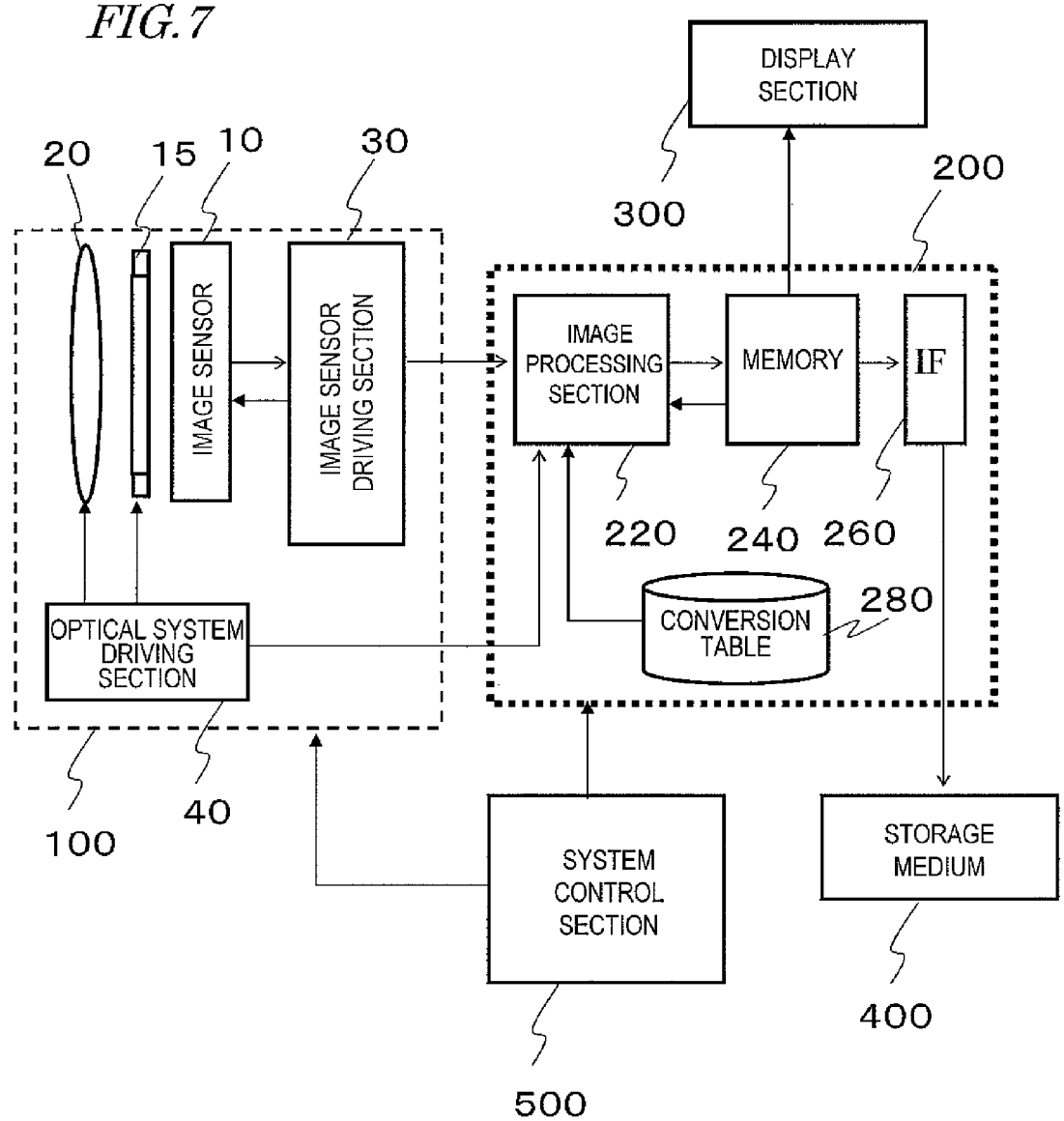
FIG. 7 A block diagram illustrating a general configuration for an image capture device as a first embodiment.

FIG. 7 is a block diagram illustrating a general configuration for an image capture device as this first embodiment. The image capture device of this embodiment is a digital electronic camera and includes an image capturing section 100, a signal processing section 200 which performs various kinds of signal processing, a captured image display section 300 which displays an image that has been captured through shooting, a storage medium 400 in which image data is stored, and a system control section 500 which controls these circuit sections.

The image capturing section 100 includes an imager (image sensor) 10 with a plurality of photosensitive cells (photodiodes) that are arranged on an imaging area, a shutter 15 with a diaphragm function, and a shooting lens 20 which produces an image on the imaging area of the image sensor 10. The image capturing section 100 further includes an optical system driving section 40 to drive the shutter 15 and the shooting lens 20 and an image sensor driving section 30 to drive the image sensor 10. Typically, the image sensor 10 is a CCD sensor or a CMOS sensor. In this embodiment, the shooting lens 20 has a known configuration and is actually a lens unit made up of multiple lenses. The optical system driving section 40 may be implemented as an LSI such as a lens driver and drives the shutter 15 and the shooting lens 20 and makes them perform various operations to get done for the purposes of optical zooming, autoexposure (AE), and autofocus (AF). The image sensor driving section 30 may be implemented as an LSI such as a COD driver, and drives the image sensor 10, thereby retrieving an analog signal from the image sensor 10 and converting it into a digital signal.

The signal processing section 200 includes an image processing section (image processor) 220, a memory 240, an interface (IF) section 260, and a conversion table 280. The conversion table 280 is a table which defines a relation between the zoom power during shooting and the size of the blur kernel. By reference to the information in the conversion table 280, the image processing section 220 changes the size of the blur kernel. Optionally, the conversion table 280 may be stored in either the memory 240 or any other storage medium. In the following description, the information recorded on the conversion table will be referred to herein as "conversion table information". The signal processing section 200 is connected to the display section 300 such as an LCD panel and to the storage medium 400 such as a memory card. The storage medium is removable from this image capture device.

The image processing section 220 carries out not only various kinds of signal processing to get color tone correction, resolution change, autoexposure, autofocusing, data compression and other operations done but also the deteriorated image restoration processing of the present invention. The image processing section 220 is suitably implemented as a combination of a known digital signal processor (DSP) or any other piece of hardware and a software program that is designed to perform image processing including the image restoration processing of the present invention. The memory 240 may be a DRAM, for example. The memory 240 not only stores the image data provided by the image capturing section 100 but also temporarily retains the image data that has been subjected to the various kinds of image processing by the image processing section 220 or compressed image data. Those image data are either converted into an analog signal and then displayed on the display section 300 or written as a digital signal on the storage medium 400 by way of the interface section 260.

All of these components are controlled by the system control section 500 including a central processing unit (CPU) and a flash memory, none of which are shown in FIG. 7. Actually, the image capture device of this embodiment further includes a viewfinder, a power supply (or battery), a flashlight and other known members. However, description thereof will be omitted herein because none of those members are essential ones that would make it difficult to understand how the present invention works unless they were described fully.

Next, an arrangement for the image capturing section 100 will be described with reference to FIGS. 8 and 9.

Figure 8:
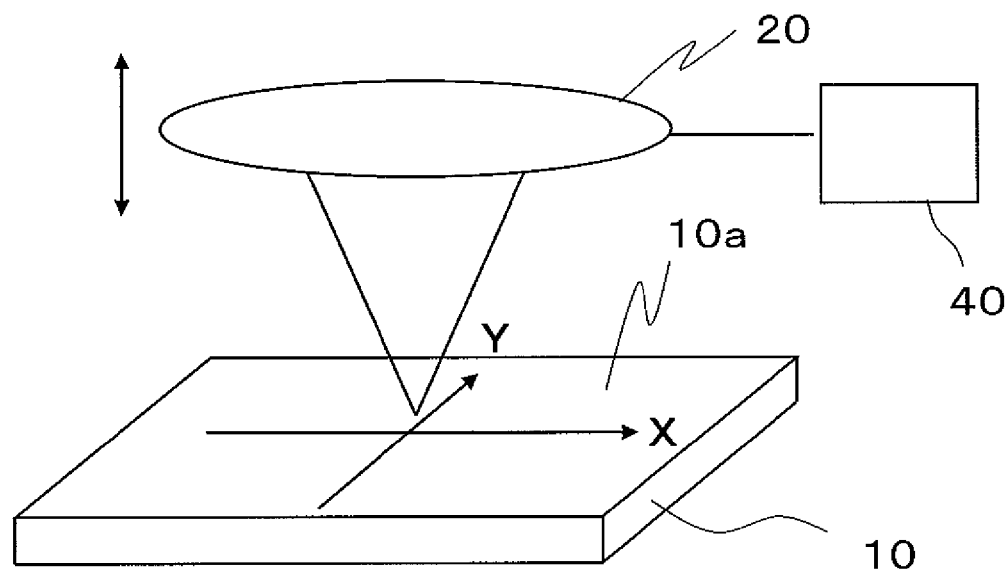
FIG. 8 Schematically illustrates a general arrangement for the image sensor 10, shooting lens 20, and optical system driving system 40 in the image capturing section 100.

FIG. 8 schematically illustrates a general arrangement for the image sensor 10, lens 20, and optical system driving system 40 in the image capturing section 100. As shown in FIG. 8, the image sensor 10 has an imaging area 10a, on which a number of photosensitive cells are arranged. In accordance with a signal supplied from the optical system driving section 40, the lens 20 moves perpendicularly to the imaging area, thereby changing the focal length and the zoom power. Although the lens 20 is illustrated in FIG. 8 as if it were a single lens for the sake of simplicity, the lens 20 may actually be a combination of multiple lenses.

Figure 9:
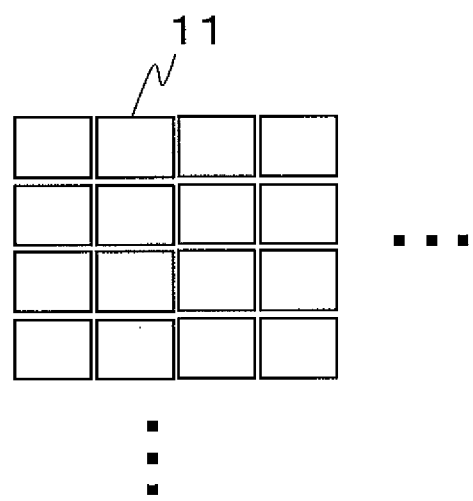
FIG. 9 A top view schematically illustrating the imaging area 10a of the image sensor 10.

FIG. 9 is a top view schematically illustrating the imaging area 10a. In this example, photosensitive cells 11 are arranged in column and rows to form a matrix pattern. However, the photosensitive cells 11 do not have to be arranged as shown in FIG. 9 and the planar shape of the respective photosensitive cells does not have to be a square shape, either. To generate a color image signal, typically, color filters representing primary colors or their complementary colors are arranged over the respective photosensitive cells 11. Alternatively, it is possible to adopt an arrangement including three image sensors which splits the incoming light into the three light rays of R, G and B and which receives those light rays in the respective colors at those three image sensors.

With such a configuration adopted, the image capturing section 100 sends the images that have been obtained through shooting and information about the zoom power during shooting (which will be referred to herein as "zoom information") to the signal processing section 200.

Next, a configuration for the image processing section 220 will be described with reference to FIG. 10.

Figure 10:
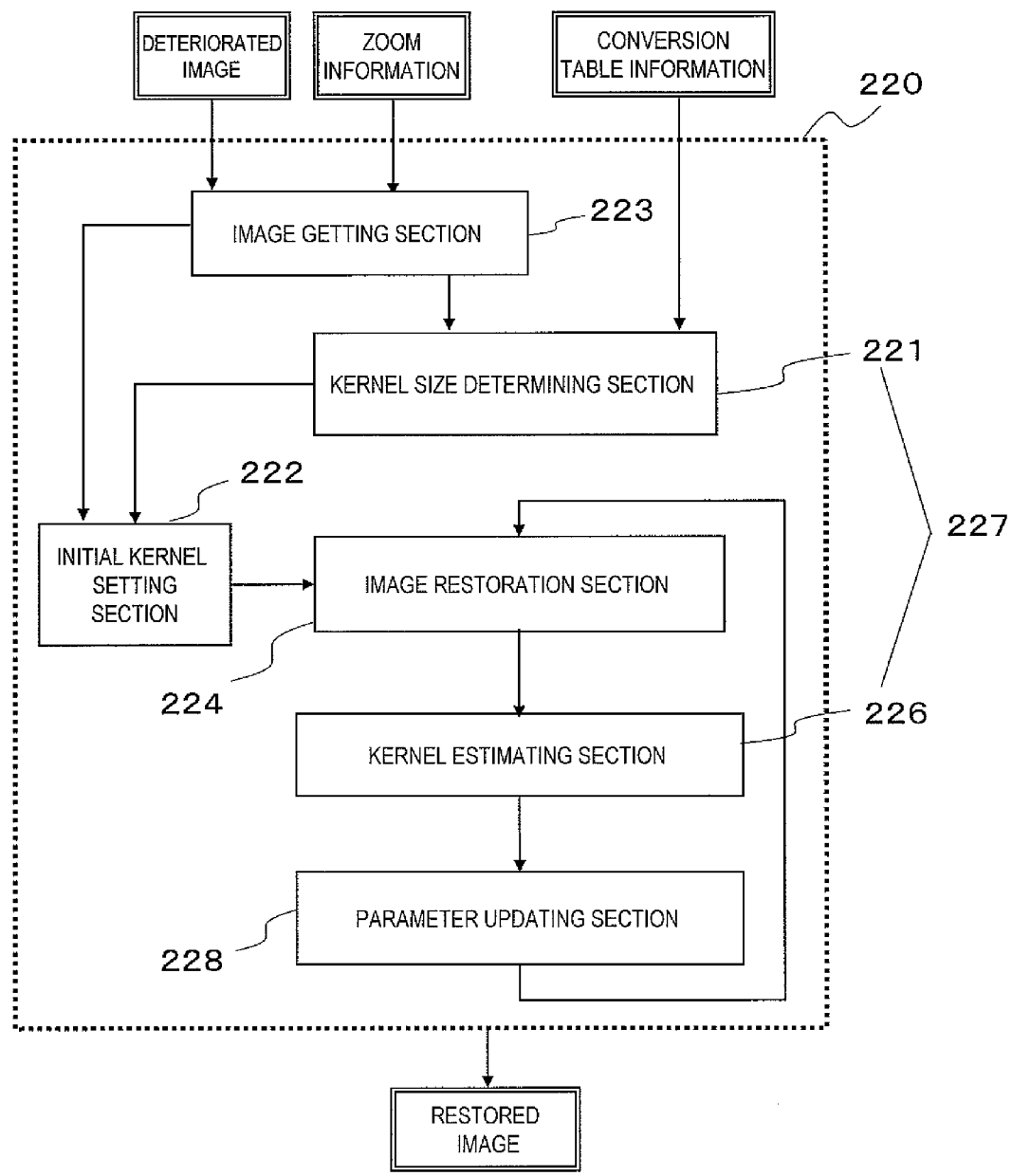
FIG. 10 A block diagram illustrating an exemplary configuration for the image processing section 220 shown in FIG. 6.

FIG. 10 is a block diagram illustrating a general configuration for the image processing section 220, which gets the deteriorated image, the zoom information and the conversion table information and which generates a restored image, of which the camera-shake-induced motion blur has been reduced, based on the deteriorated image and outputs it. The image processing section 220 includes an image getting section 223, a kernel size determining section 221, an initial kernel setting section 222, an image restoration section 224, a kernel estimating section 226 and a parameter updating section 228.

The image getting section 223 gets the deteriorated image and the zoom information from the image capturing section 100.

The kernel size determining section 221 determines the size of the blur kernel by reference to the zoom information that has been gotten from the image capturing section 100 and the conversion table information recorded in the conversion table 280. Specifically, the kernel size determining section 221 obtains a "blur kernel's magnification" corresponding to the zoom power when the deteriorated image is obtained from the conversion table, multiplies a reference size by the blur kernel's magnification thus obtained, and defines the product to be the size of the blur kernel. In this description, the "reference size" refers herein to the size of the blur kernel when the zoom power is 1×. The reference size may be either set in advance as a fixed value for the image capture device or manually set by the user. In the latter case, the reference size may be set more appropriately with a difference in the magnitude of motion blur caused by individual users taken into account. Alternatively, a different blur kernel's size may be determined based on various shooting parameters to use to get the image every time a shooting session is carried out. The conversion table will be described in detail later.

The initial kernel setting section 222 sets an initial blur kernel which needs to be used to perform this restoration processing. The initial blur kernel may be either set manually or defined in advance as a fixed coefficient matrix. Still alternatively, every time a shooting session is carried out, a different initial blur kernel may also be set based on various kinds of shooting parameters to get an image. In order to get the image processing done as quickly as possible, it is recommended that the initial blur kernel be as close to the actual blur kernel as possible. However, the restoration processing can also be carried out even if the initial blur kernel is not close to the actual one. The size of the initial blur kernel may be set to be a different value according to the restoration algorithm to be described later. For example, if the algorithm disclosed in Non-Patent Document No. 1 is used, the size of the initial blur kernel may be set to be a relatively small value such as 3×3 pixels. On the other hand, if an algorithm that does not involve changing the size of the blur kernel is used in the restoration process, the size of the initial blur kernel may be the size determined by the kernel size determining section 221.

The image restoration section 224 generates a restored image based on the deteriorated image by using the initial blur kernel. The kernel estimating section 226 estimates the blur kernel based on the deteriorated image and the restored image that has been generated by the image restoration section 224. The parameter updating section 228 updates the initial blur kernel into the one that has been estimated by the kernel estimating section 260. The initial blur kernel updated is given to the image restoration section 224, where the same series of processing steps are carried out all over again.

The configuration shown in FIG. 10 show an exemplary set of functional blocks of the image processing section 220. And the image processing section 220 may be divided into any other set of functional blocks as well. The image processing section 220 may also be implemented by installing an image processing software program into a known piece of hardware as well. In this description, the kernel size determining section 221 and kernel estimating section 226 shown in FIG. 10 will be collectively referred to herein as a blur kernel determining section 227.

Next, the conversion table of this embodiment will be described. FIG. 11(a) shows an example of a conversion table for use in this embodiment. In this example, the conversion table defines a correspondence between the zoom power range and the blur kernel's magnifications. By reference to such a conversion table, the kernel size determining section 221 learns that if the zoom power falls within the range of z1 through z2, the blur kernel's magnification should be set to be A1. FIG. 11(b) shows another exemplary conversion table. As in the example shown in FIG. 11(b), the size of the blur kernel may be defined so as to be directly determined by the zoom power. In that case, there is no need to set the blur kernel reference size described above. For example, if the zoom power falls within the range of z1 through z2, the blur kernel's size is set to be N1×N1 (where N1 is an integer that is equal to or greater than three). It should be noted that since the zoom power is adjusted by changing the focal length of an optical system, the "focal length" may be defined instead of the "zoom power" in this conversion table. The conversion table does not always have to be such ones but may also be any other kind of table as long as the table shows a correspondence between the zoom power of the optical system and the size of the blur kernel.

The conversion table is drawn up beforehand as a piece of advance information. Hereinafter, it will be described as an example how such a conversion table may be drawn up.

First of all, with the zoom power set to be a particular value, multiple persons are made to shoot the same landmark object (such as a chart or a point light source, of which the traveling distance can be measured within a given image) a number of times and measure its traveling distance each time. Next, measurements are carried out in the same way with the zoom power changed into other values and the average of the traveling distances is calculated on a zoom power basis. And information indicating a relation between the average traveling distance thus obtained and the zoom power is written on the conversion table.

Optionally, the information stored on the conversion table may be rewritten as needed. For example, the image capture device may have the function of learning the trend of the motion blurs of images that have been shot by a user so far and rewriting the conversion table according to his or her trend.

Hereinafter, it will be described generally in what procedure a shooting session may be carried out with the image capture device of this embodiment.

First of all, the user points the image capture device toward the subject and chooses a zoom power he or she likes. Next, when he or she presses the shutter releases button halfway, the focus is set on the subject through an autofocus operation. And when he or she presses the shutter release button down fully, an "exposure" process starts. At this point in time, a subject image is produced on the imaging area of the image sensor 10. If the image capture device is moved irregularly by the user during the exposure process, then the image moves over the imaging area of the image sensor 10. As a result, the image gets blurred due to the camera shake. When the exposure process is finished, the image capturing section 100 sends the image thus captured (i.e., the deteriorated image) and information about the zoom power (i.e., the zoom information) to the image processing section 220 in the signal processing section 200.

Figure 12:
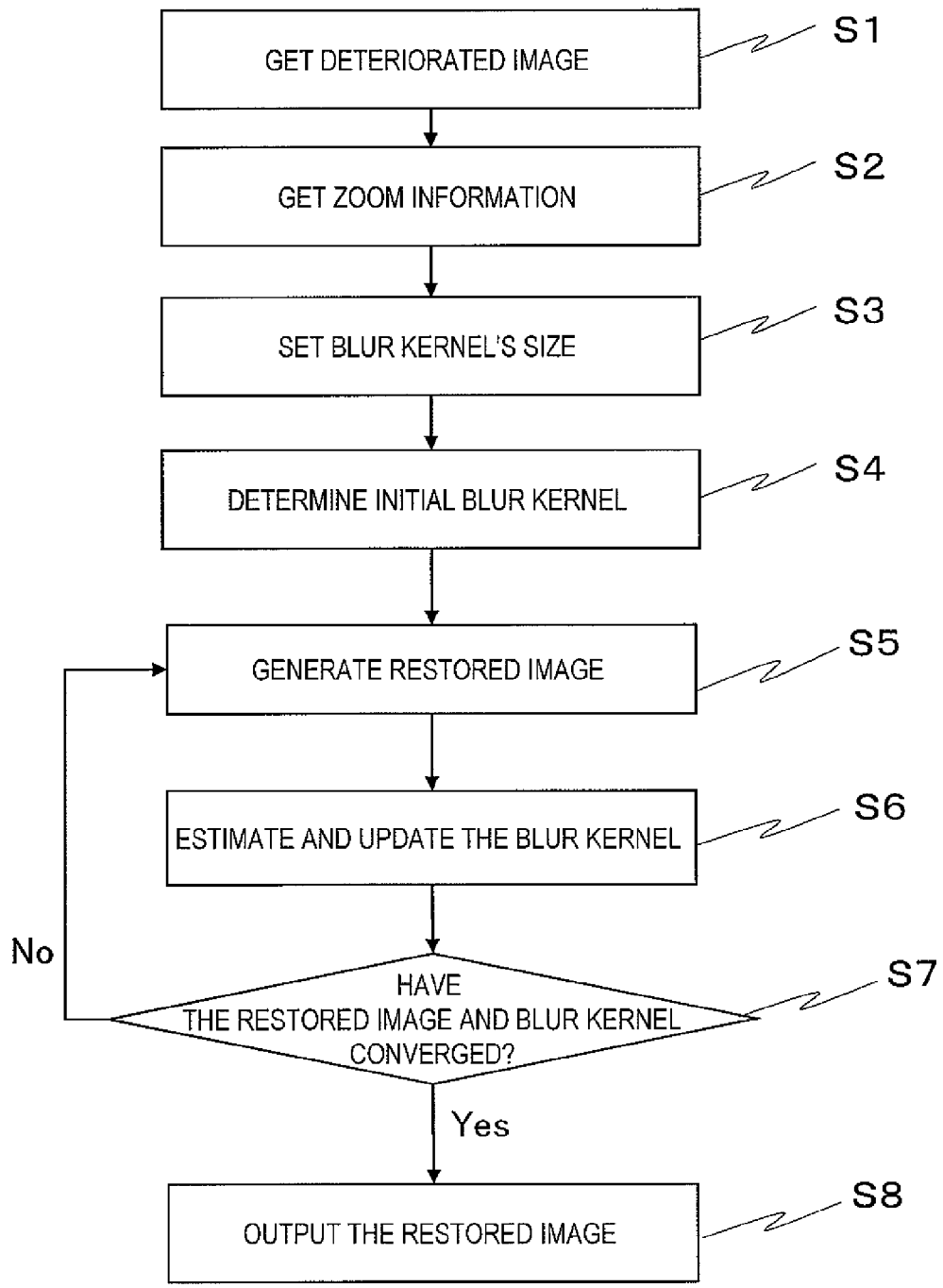
FIG. 12 A flowchart showing an exemplary procedure of the restoration processing to be carried out in the first embodiment.

Hereinafter, the procedure of the operation to be performed by the image processing section 220 will be described with reference to FIG. 12.

The image processing section 220 gets the deteriorated image in Step S1 and the zoom information in Step S2, respectively. Optionally, these processing steps S1 and S2 may be performed in reverse order. Next, in Step S3, the size of the blur kernel is determined by the kernel size determining section 221. In this processing step, the kernel size determining section 221 chooses an appropriate blur kernel's size associated with the given zoom power by reference to the conversion table information. Subsequently, in Step S4, an initial blur kernel is determined by the initial blur kernel setting section 222.

Then, in Step S5, the image restoration section 224 performs image restoration processing using the deteriorated image that has been gotten in Step S1 and the initial blur kernel that has been set in Step S4. This image restoration processing is carried out by the image restoration section 224 by a known restoration algorithm. The image restoration section 224 once stores the restored image thus obtained in the memory 240. Thereafter, in Step S6, the kernel estimating section 226 estimates the blur kernel based on the restored image and the parameter updating section 228 updates the previous blur kernel into the blur kernel thus estimated.

Subsequently, in Step S7, a decision is made on whether or not changes of the blur kernel and the restored image before and after the update are smaller than predetermined threshold values. If the changes are equal to or greater than the threshold values, the processing step S5 is carried out again and the same series of the processing steps S5 through S7 will be performed over and over again until the changes become smaller than the threshold values. And when the changes become smaller than the threshold values, it is determined that the processing has converged. In that case, the result of the restoration is stored in the memory 240 in Step S8.

Next, it will be described in further detail how the blur kernel may be estimated and how the image restoration processing may be carried out in Steps S5 and S6.

In this example, it will be described how to perform the image restoration processing by the signal processing method disclosed in Non-Patent Document No. 2. According to the signal processing method of Non-Patent Document No. 2, a first image restoration process is carried out based on the initial blur kernel that has been set in Step S4. At this stage, the blur kernel does not always agree with the true blur kernel (which will be referred to herein as a "right solution"). However, the result of the restoration should be closer to the original image than the deteriorated image is.

Next, the blur kernel is estimated based on a first restored image which has been obtained as a result of the first image restoration process. Since the first restored image is closer to the original image than the deteriorated image is, the blur kernel estimated is also closer to the right solution. Then, the blur kernel thus estimated, i.e., the initial blur kernel, is updated into the next blur kernel and a second image restoration process is carried out. By performing these processing steps over and over again until neither the blur kernel nor the result of the image restoration processing changes any longer, estimation of the blur kernel and the image restoration processing are carried out at the same time.

Hereinafter, it will be described more specifically how to carry out the image restoration processing.

The image restoration section 224 restores an image using a given blur kernel (which is an initial value at first but will be an updated value from next time and on) and the deteriorated image. The following Equation (3) is an evaluation equation $E_L$ for use in this processing:

$$E_L = \left( \sum_{\partial^* \in \Theta} w_{\kappa(\partial^*)} \| \partial^* L \otimes f - \partial^* I \|_2^2 \right) + \lambda_1 \| \Phi(\partial_x L) + \Phi(\partial_y L) \|_1 + \qquad (3)$$
$$\lambda_2 ( \| \partial_x L - \partial_x I \|_2^2 \circ M + \| \partial_y L - \partial_y I \|_2^2 \circ M ).$$

where I represents the deteriorated image, L represents a non-blurry image, and f represents the blur kernel. The variables wk, λ1 and λ2 are "weights" to be set manually. θ is a set of operators that defines what kind of differentiation the image is going to be subjected to. Specifically, θ has six differentiation parameters in total for use to perform a zero-order differentiation, first-order differentiations (in the x and y directions, respectively) and second-order differentiations (twice in each of the x and y directions and once more in each of the x and y direction). d* is a differentiation operator. Using d*, θ can be represented as θ={$d^0$, $d_x$, $d_y$, $d_{xx}$, $d_{xy}$, $d_{yy}$}. By adopting d*, processing can be performed using both of the intensity information and the edge information, and therefore, information that could not be obtained only with the intensity can also be gotten. M is a two-dimensional mask and includes a "1" element in pixels included in a flat area of the image (i.e., pixels included in a locally smooth area (Ω)) but a "0" element in pixels in the other areas. ∥ and $\|_p$ indicate p norm operators. And φ(x) is a function approximately showing a relation between the intensity gradient x of the image observed in nature and its distribution density (in a logarithmic scale).

The first term on the right side of Equation (3) indicates the difference (i.e., a distance) between an image obtained by performing a convolution on the restored image L and the blur kernel f and the deteriorated image I. By subjecting the image to an operation that uses six differentiation parameters, the degree of approximation of the image can be evaluated based on information about other than the intensity.

The second term on the right side of Equation (3) indicates the property of an intensity gradient in the image (which is called a "heavy tail"). Φ($d_x$L) and Φ($d_y$L) have statistical characteristics that when the intensity gradient of the restored image is represented as a histogram, a peak with a steep probability of occurrence appears at a gradient of around zero and the probability of occurrence falls as the gradient rises. In the second term, distances from the distribution with such statistical characteristics are calculated for each of the gradients in the x and y directions. These statistical characteristics are also used in the method disclosed in Non-Patent Document No. 1.

The third term on the right side of Equation (3) is used to evaluate the degree of flatness using the mask M, the differentiated deteriorated image, and the differentiated restored image. In a flat region, the deteriorated image and the restored image have close intensity gradient values. That is why the error of the gradient values in the x and y directions is used as an evaluation value.

By obtaining L that minimizes the right side of Equation (3), the restored image L can be obtained (i.e., L is optimized). A specific calculation method for optimizing L is disclosed in Non-Patent Document No. 2.

Next, the processing to be performed by the kernel estimating section 226 after the restored image L has been obtained will be described in detail.

The blur kernel estimation is a problem for estimating the blur kernel f based on the restored image L that has been obtained by the image restoration section 224 and the deteriorated image I. By determining f so as to minimize the right side of the following Equation (4), the blur kernel f can be obtained (i.e., f is optimized).

$$E(f) = \left( \sum_{\partial^* \in \Theta} w_{\kappa(\partial^*)} \| \partial^* L \otimes f - \partial^* I \|_2^2 \right) + \| f \|_1. \qquad (4)$$

The first term on the right side of this Equation (4) corresponds to the first term on the right side of Equation (3) and provides an evaluation index indicating whether or not the convolution performed on the restored image L and the blur kernel f is close to the deteriorated image I. The second term on the right side of Equation (4) is a norm of the blur kernel f and is a term based on a so-called "sparse coding" concept. Since most elements of the matrix representing the blur kernel f are zero (i.e., have no motion), this optimization term is used. In this embodiment, the optimization is done by the "interior point method" as in Non-Patent Document No. 2 and overall optimization can get done as a result.

It should be noted that the image restoration processing does not always have to be done as in the example described above. Alternatively, the method disclosed in Non-Patent Document No. 1 or any other blind deconvolution method may also be used.

In the image restoration processing of this embodiment, the point is that the size of the blur kernel is changed as the zoom power varies. As a result, when an image is shot at a high zoom power, at which motion blur occurs easily, the size of the blur kernel is set to be a large value, and therefore, it is possible to prevent the size of the blur kernel from exceeding the preset one. Conversely, when an image is shot at a low zoom power, the size of the blur kernel is set to be a small value, and therefore, it is possible to avoid doing computations more than necessarily. Furthermore, since the restoration processing performed by the image capture device of this embodiment does not include the processing step of reducing the pixel size of the deteriorated image, the image can be restored without decreasing the resolution.

In the foregoing description, the size of the blur kernel is supposed to be determined by the zoom power. However, the size of the blur kernel may also be determined by the exposure time, instead of the zoom power. In that case, a relation between the exposure time and the size of the blur kernel is defined on the conversion table 280. Also, the image processing section 220 gets information about the exposure time when the image was captured from the image capturing section 100. With such a configuration adopted, the kernel size determining section 221 can determine the best size of the blur kernel based on the exposure time gotten from the image capturing section 100 and the information on the conversion table.

FIG. 13 shows examples of conversion tables for use in a situation where the size of the blur kernel is changed as the exposure time varies. Specifically, FIG. 13(a) shows an exemplary conversion table that defines a relation between the exposure time range and the blur kernel's magnification, while FIG. 13(b) shows an exemplary conversion table that defines a relation between the exposure time range and the blur kernel's size. No matter which of these two conversion tables shown in FIGS. 13(a) and 13(b) is used, the best size can be chosen according to the given exposure time. For example, if the conversion table shown in FIG. 13(a) is used and if the exposure time when the image was captured falls within the range of T1 through T2, the blur kernel's magnification is set to be B1.

Optionally, the image capture device may also change the size of the blur kernel according to both the zoom power and the exposure time. In that case, both a zoom power related conversion table and an exposure time related conversion table may be stored in the image capture device. Then, the size of the blur kernel is determined by multiplying the reference size by magnifications to obtained from those tables based on the given zoom power or exposure time. For example, if the zoom power related conversion table shown in FIG. 11(a) and the exposure time related conversion table shown in FIG. 13(a) are stored in the image capture device and if the zoom power falls within the range of z2 through z3 and if the exposure time falls within the range of T10 through T11, the size of the blur kernel is set to be the reference size multiplied by (A2×B10).

Optionally, the zoom power related conversion table and the exposure time related conversion table may be combined together into a single table. FIG. 14 shows examples of such tables in which those two kinds of information are aggregated together. Specifically, FIG. 14(a) shows an exemplary conversion table that defines correspondence between the zoom power-exposure time combination and the blur kernel's magnification, while FIG. 14(b) shows an exemplary conversion table that defines a correspondence between the zoom power-exposure time combination and the blur kernel's size. No matter which of these two conversion tables shown in FIGS. 14(a) and 14(b) is used, the best blur kernel's size can be chosen with both kinds of information about the zoom power and the exposure time taken into account. For example, if the conversion table shown in FIG. 14(a) is used and if the zoom power falls within the range of z2 through z3, and if the exposure time falls within the range of T2 through T3, the blur kernel's magnification is set to be C22.

According to this embodiment, as long as the blur kernel's size can be changed appropriately as the zoom power and/or the exposure time varies, the conversion table does not always have to be used. For example, similar processing can also be carried out by using a function representing the relation between the zoom power and/or the exposure time and the blur kernel's size. In that case, first of all, a known object of shooting is shot with the zoom power and/or the exposure time changed one after another, thereby getting blur kernel's sizes at various zoom powers and/or exposure times. Next, the data thus obtained is plotted in a two-dimensional space with the zoom power and/or the exposure time represented by the abscissa and the blur kernel's size represented by the ordinate. Subsequently, linear regression and/or curve fitting is performed on the data plotted, thereby representing the relation between the zoom power and/or the exposure time and the blur kernel's size as a multi-dimensional function. Once such a multi-dimensional function has been obtained in this manner, the zoom power and the exposure time that have been obtained during the shooting session are substituted into the multi-dimensional function, thereby obtaining the blur kernel's size. According to such a method, no conversion table needs to be used.

If necessary, the image restoration processing of this embodiment may also be carried out by an image processor which is independent of the image capture device. For example, even by entering the deteriorated image, zoom information and exposure time information that have been gotten by the image capture device into such an image processor and by getting a program defining the processing shown in FIG. 12 executed by a computer built in that image processor, the restored image can also be obtained.

Embodiment 2

Hereinafter, a second embodiment of the present invention will be described with reference to FIGS. 15 through 17. Just like the image capture device of the first embodiment described above, the image capture device of this embodiment also determines the size of the blur kernel by reference to the relation between the zoom power and the blur kernel's size. However, the image capture device of this embodiment determines the size of the blur kernel in accordance with the information provided by its camera shake sensing section, which is a major difference from the image capture device of the first embodiment. The following description of this embodiment will be focused on only such differences between the image capture devices of this and first embodiments, and their common features will not be described all over again to avoid redundancies.

Figure 15:
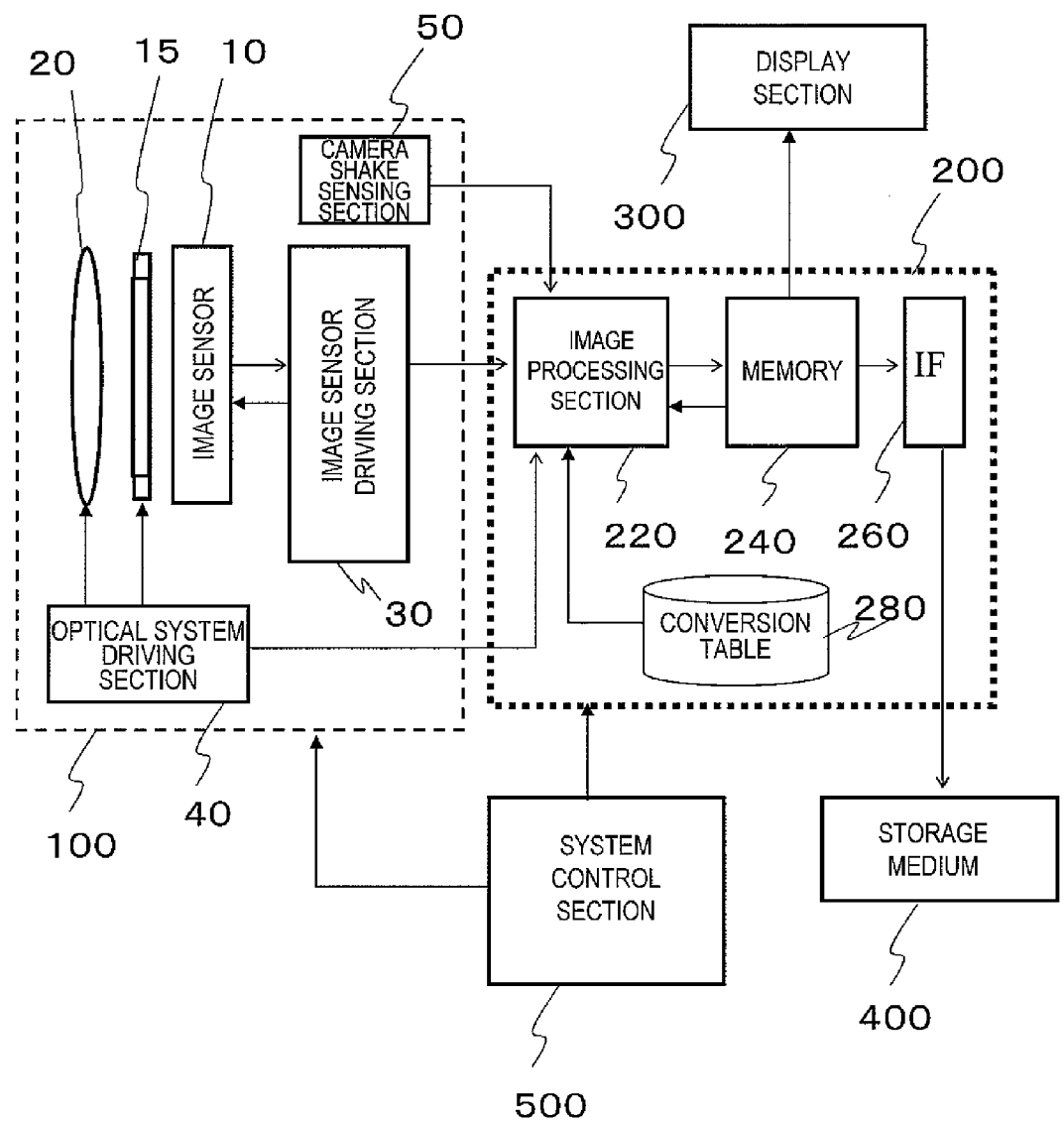
FIG. 15 A block diagram illustrating a general configuration for an image capture device according to a second embodiment.

FIG. 15 illustrates a general configuration for an image capture device according to this embodiment. As shown in FIG. 15, the image capturing section 100 includes a camera shake sensing section 50, which may be an angular velocity sensor such as a gyrosensor and which senses the angular velocity of the image capture device during shooting, thereby generating information indicating the magnitude of the camera shake (which will be referred to herein as "camera shake information"). As long as it can sense the magnitude of a camera shake, any known sensor may be used as the camera shake sensing section 50. The camera shake information, along with the deteriorated image and the zoom information, is provided for the image processing section 220 of the signal processing section 200.

The conversion table 280 of this embodiment includes not only the information about the zoom power but also information about the magnitude of the camera shake as well. FIG. 16 shows an example of such a conversion table 280. For example, if the zoom power falls within the range of z1 through z2 and if the magnitude of the camera shake falls within the range of M2 through M3 according to the camera shake information, the blur kernel's magnification is set to be A12. In this case, the magnitude of a camera shake may be defined by a numerical value indicating how many pixels the image could move at maximum due to a camera shake that has occurred during the exposure process, for example. The conversion table 280 does not have to be the one shown in FIG. 16 but a zoom power related conversion table and a magnitude of camera shake related conversion table may be stored independently of each other. In that case, the blur kernel's magnification can be determined by multiplying together the magnifications obtained from the respective tables.

Figure 17:
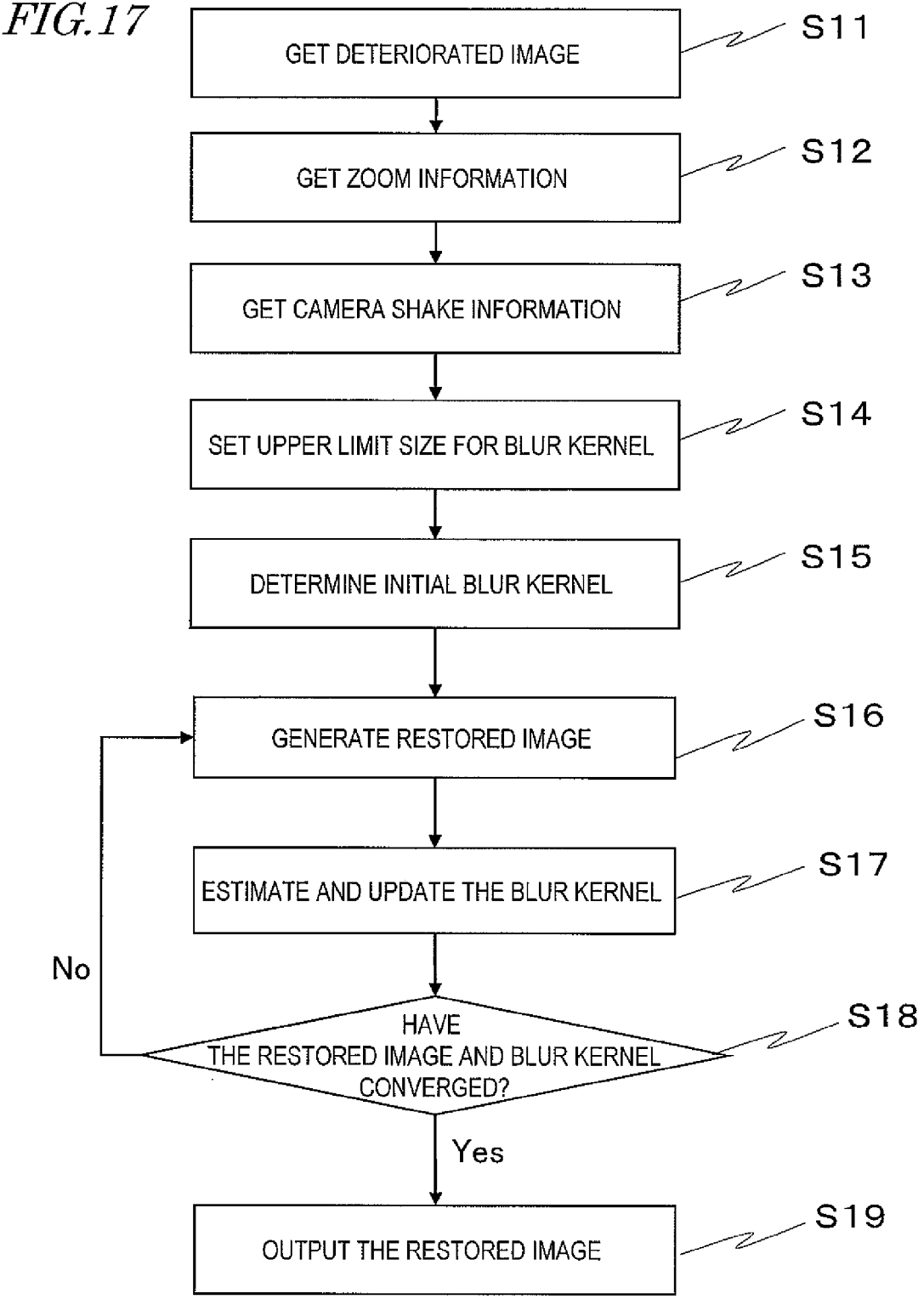
FIG. 17 A flowchart showing an exemplary procedure of the restoration processing to be carried out in the second embodiment.
Figure 18:
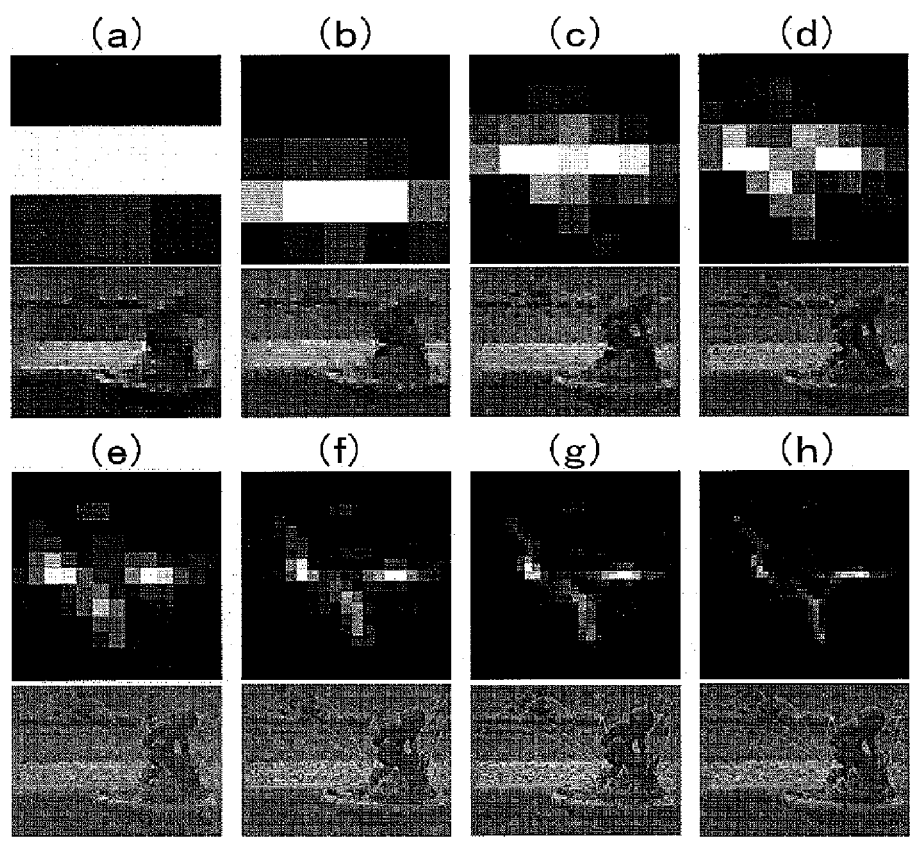
FIG. 18 (a) through (h) illustrate the method disclosed in Non-Patent Document No. 1.

FIG. 17 is a flowchart showing the procedure of image processing to be carried out by the image processing section 220 of this embodiment. In Steps S11 and S12, the deteriorated image and the zoom information are gotten as in Steps S1 and S2 of the first embodiment. Next, in Step S13, the kernel size determining section 221 gets the camera shake information that has been generated by the camera shake sensing section 50. Subsequently, in Step S14, the kernel size determining section 221 determines the size of the blur kernel based on the zoom power, the camera shake information and the conversion table information. Step S15 and the processing steps that follow it are the same as its counterparts of the first embodiment described above.

Optionally, in Step S15, the blur kernel may be estimated by a known method by reference to the information gotten from the camera shake sensing section 50 and the estimated blur kernel may be set to be the initial blur kernel. Such a method for estimating a blur kernel by reference to the information provided by a camera shake sensing section is disclosed in Japanese Laid-Open Patent Publication No. 2006-129236, for example. If the initial blur kernel has been set in this manner, a restored image may be obtained by performing a known non-blind deconvolution such as a Wiener filter method or a Richardson-Lucy (RL) method instead of the processing steps S16 to S18.

In this embodiment, the conversion table is drawn up in almost the same way as in the first embodiment described above. However, the measurements need to be made in view of not only the zoom power (or the focal length) but also the information provided by the camera shake sensing section as well.

Since the image capture device of this embodiment uses the information provided by the camera shake sensing section 50, the blur kernel's size can be determined with the magnitude of the camera shake that has actually occurred taken into account. Consequently, compared to the image capture device of the first embodiment, the blur kernel's size can be set to be an even more appropriate value.

Although the blur kernel's size is determined based on the zoom power and the camera shake information according to this embodiment, this is only an exemplary method for determining the blur kernel's size according to the present invention. Alternatively, the blur kernel's size may also be determined by reference to the information about exposure time as well as in the first embodiment described above. Still alternatively, information about the exposure time may be used without using the information about the zoom power. Furthermore, the blur kernel's size may also be determined by reference to only the information provided by the camera shake sensing section 50 without using the information about the zoom power or the information about the exposure time at all. Such a method is effectively applicable to an image capture device that does not have a zoom lens but has a single-focus lens with a fixed focal length.

If necessary, the image restoration processing of this embodiment may also be carried out by an image processor which is independent of the image capture device. For example, even by entering the deteriorated image, zoom information and camera shake information that have been gotten by the image capture device into such an image processor and by getting a program defining the processing shown in FIG. 17 executed by that image processor, the restored image can also be obtained.

INDUSTRIAL APPLICABILITY

The image capture device of the present invention has broad industrial applicability because the present invention is applicable to any image capture device that could ever cause a motion blur due to a camera shake. Since a PSF and a restored image can be both estimated even when the PSF is unknown, a much less blurry image can be obtained with or without a special image stabilization mechanism.

The image processor of the present invention does not have to be built in an image capture device but may be configured to receive and process the data of an image that has been captured by the image capture device.

REFERENCE SIGNS LIST 10 image sensor
11 photosensitive cell
15 shutter with diaphragm function
20 shooting lens
30 image sensor driving section
40 optical system driving section
50 camera shake sensing section
100 image capturing section
200 signal processing section
220 image processing section
221 kernel size determining section
222 initial kernel setting section
223 image getting section
224 image restoration section
226 kernel estimating section
227 blur kernel determining section
228 parameter updating section
240 memory
250 image processor
260 interface (IF)
280 conversion table
300 display section
400 storage medium
500 system control section

The invention claimed is:

1. An image capture device which is configured to generate a restored image by reducing a motion blur that has been induced by a camera shake during shooting, the device comprising:
   an image sensor;
   an optical system which produces an image on an imaging area of the image sensor; and
   an image processing section which processes a signal that has been obtained by the image sensor,
   wherein the image processing section includes:
   a blur kernel determining section which determines a blur kernel that defines the camera-shake-induced motion blur of the image that has been captured by the image sensor, the blur kernel being a coefficient matrix representing a point spread function; and
   an image restoration section which generates the restored image by reducing the camera-shake-induced motion blur from the image using the blur kernel that has been determined, and
   wherein the blur kernel determining section sets the size of the blur kernel by reference to information that affects the degree of the blur of the image, the size of the blur kernel being the number of elements of the coefficient matrix, and
   wherein the blur kernel determining section changes the size of the blur kernel according to an exposure time.

2. The image capture device of claim 1, wherein the blur kernel determining section changes the size of the blur kernel according to the zoom power of the optical system.

3. The image capture device of claim 2, further comprising a conversion table which defines a correspondence between the zoom power of the optical system and the size of the blur kernel,
   wherein the blur kernel determining section sets the size of the blur kernel by reference to the conversion table.

4. The image capture device of claim 3, wherein the conversion table defines a correspondence between the zoom power of the optical system and a magnification of the blur kernel with respect to its reference size.

5. The image capture device of claim 2, wherein the blur kernel determining section sets the size of the blur kernel by reference to both pieces of information about the zoom power of the optical system and an exposure time.

6. The image capture device of claim 5, further comprising a conversion table which defines a correspondence between the size of the blur kernel and a combination of the zoom power of the optical system and the exposure time,
wherein the blur kernel determining section sets the size of the blur kernel by reference to the conversion table.

7. The image capture device of claim 1, further comprising a conversion table which defines a correspondence between the exposure time and the size of the blur kernel,
wherein the blur kernel determining section sets the size of the blur kernel by reference to the conversion table.

8. The image capture device of claim 7, wherein the conversion table defines a correspondence between the exposure time and a magnification of the blur kernel with respect to its reference size.

9. The image capture device of claim 1, further comprising a camera shake sensing section which senses the magnitude of the camera shake during shooting,
wherein the blur kernel determining section sets the size of the blur kernel based on the magnitude of the camera shake that has been sensed by the camera shake sensing section.

10. The image capture device of claim 9, wherein the camera shake sensing section is a gyrosensor.

11. An image processor which is configured to generate a restored image by reducing a motion blur that has been induced by a camera shake from an image that has been captured by an image capture device, the processor comprising:
an image getting section which gets the image and information that affects the degree of the motion blur of the image;
a blur kernel determining section which determines a blur kernel that defines the camera-shake-induced motion blur of the image, the blur kernel being a coefficient matrix representing a point spread function; and
an image restoration section which generates the restored image by reducing the camera-shake-induced motion blur from the image using the blur kernel that has been determined, and
wherein the blur kernel determining section sets the size of the blur kernel by reference to the information that affects the degree of the blur of the image, the size of the blur kernel being the number of elements of the coefficient matrix, and
wherein the blur kernel determining section changes the size of the blur kernel according to an exposure time.

12. The image processor of claim 11, wherein the shooting information is at least one piece of information about the zoom power of an optical system, an exposure time, and the magnitude of the camera shake during shooting.

13. A computer program, stored on a non-transitory computer-readable storage medium, to be executed by a computer which is designed to generate a restored image by reducing a motion blur that has been induced by a camera shake from an image that has been captured by an image capture device, the program being defined to make the computer perform the steps of:
getting the image and information that affects the degree of the motion blur of the image;
setting the size of a blur kernel that defines the camera-shake-induced motion blur of the image by reference to the information that affects the degree of the motion blur of the image and changing the size of the blur kernel according to an exposure time, the blur kernel being a coefficient matrix representing a point spread function, the size of the blur kernel being the number of elements of the coefficient matrix;
determining the blur kernel; and
generating the restored image by reducing the camera-shake-induced motion blur from the image using the blur kernel that has been determined.

14. The computer program of claim 13, wherein the information that affects the degree of the motion blur of the image is at least one piece of information about the zoom power of an optical system, an exposure time, and the magnitude of the camera shake during shooting.

15. An image processing method for generating a restored image by reducing a motion blur that has been induced by a camera shake from an image that has been captured by an image capture device, the method comprising the steps of:
getting the image and information that affects the degree of the motion blur of the image;
setting the size of a blur kernel that defines the camera-shake-induced motion blur of the image by reference to the information that affects the degree of the motion blur of the image and changing the size of the blur kernel according to an exposure time, the blur kernel being a coefficient matrix representing a point spread function, the size of the blur kernel being the number of elements of the coefficient matrix;
determining the blur kernel; and
generating the restored image by reducing the camera-shake-induced motion blur from the image using the blur kernel that has been determined.

16. The method of claim 15, wherein the information that affects the degree of the motion blur of the image is at least one piece of information about the zoom power of an optical system, an exposure time, and the magnitude of the camera shake during shooting.

* * * * *